United States Patent [19]

Salice

[11] Patent Number: 5,667,327
[45] Date of Patent: Sep. 16, 1997

[54] CONNECTING FITTING

[75] Inventor: Luciano Salice, Carimate, Italy

[73] Assignee: Arturo Salice S.p.A., Noverdrate, Italy

[21] Appl. No.: 544,691

[22] Filed: Oct. 18, 1995

[30] Foreign Application Priority Data

Oct. 18, 1994 [DE] Germany .................. 44 37 273.6

[51] Int. Cl.[6] .................................................. F16B 12/16
[52] U.S. Cl. .................. 403/231; 403/245; 403/321; 403/407.1; 403/DIG. 8
[58] Field of Search ........................ 403/230, 231, 403/405.1, 407.1, 409.1, 292, 297, 264, 300, 301, 314, 245, 321, 323, DIG. 8; 411/44; 312/348.4, 348.1, 334.1, 111, 140

[56] References Cited

U.S. PATENT DOCUMENTS

| | | | |
|---|---|---|---|
| 4,487,522 | 12/1984 | Appleby et al. | 403/231 |
| 4,549,831 | 10/1985 | Lautenschläger, Jr. | 403/405.1 X |
| 4,553,873 | 11/1985 | Salice | 403/245 |
| 4,579,474 | 4/1986 | Rock et al. | 403/323 X |
| 4,826,345 | 5/1989 | Salice | 403/231 |
| 4,923,321 | 5/1990 | Kriz | 403/231 X |

FOREIGN PATENT DOCUMENTS

| | | | |
|---|---|---|---|
| 1168690 | 6/1984 | Canada | 312/111 |
| 507289 | 10/1992 | European Pat. Off. | 312/111 |
| 2445461 | 8/1980 | France | 403/323 |
| 2559557 | 8/1985 | France | 312/111 |
| 35 60 65 | 7/1922 | Germany . | |
| 25 36 750 | 10/1975 | Germany . | |
| 27 11 280 | 3/1977 | Germany . | |
| 2546751 | 4/1977 | Germany | 403/231 |
| 2642488 | 12/1977 | Germany | 403/230 |
| 27 48 272 | 5/1979 | Germany . | |
| 90 00 151.6 | 4/1990 | Germany . | |
| 297490 | 1/1992 | Germany | 312/140 |

*Primary Examiner*—Harry C. Kim
*Attorney, Agent, or Firm*—Jacobson, Price, Holman & Stern, PLLC

[57] ABSTRACT

A connection fitting for the releasable connection together of two furniture parts preferably running together at a right angle. The connection fitting includes on the one hand a pot-like housing to be inserted into one first furniture part and which is provided with a hole, and on the other hand a pin held in the hole and which at its front end extending past the fitting part possesses a preferably eccentric locking member to be introduced into an aligned hole in the other furniture part and which is provided with a radial actuating lever.

16 Claims, 3 Drawing Sheets

CONNECTING FITTING

FIELD OF THE INVENTION

The invention relates to a connecting fitting for providing a releasable connection between two furniture parts and more particularly two such parts running together at a right angle.

BACKGROUND OF THE INVENTION

Connecting fittings for the releasable connection of furniture parts are known in various different designs. Such connection fittings either comprise two fitting parts, which must be joined with each of the furniture parts to be joined prior to assembly (see German patent publication 9,000,151 U), or they possess a complicated structure (see German patent publication 2,748,272 A). Furthermore known connection fittings may generally only be mounted with the aid of tools.

SUMMARY OF THE INVENTION

One object of the present invention is to create a connection fitting of the type initially mentioned, which possesses a simple structure and may be fitted in place in a simple manner by hand without play.

The connection fitting in accordance with the invention is characterized by a particularly simple structure, since it only possesses one single moving part, that is to say a pin which is arranged for rotary movement in the pot-like housing of the connection fitting and has a front end, bearing an eccentric locking member, adapted to be fitted in a hole in the other furniture part. The connection fitting in accordance with the invention may be mounted by hand and without tools, since for locking the two furniture parts after introduction of the end, provided with the locking member, of the pin into the hole in the other furniture part it is merely necessary for a lever turning the pin to be turned by hand. Since such turning of the lever means that the locking pin is turned through one revolution this causes that the eccentric locking member to come into a locking force-fit engagement with the wall of the hole in said other furniture part.

In accordance with a further development of the invention the hole in the housing wall is provided for at least a part of its length with screw threads and the pin possesses at least one screw thread rib adapted to fit into the screw thread in the wall. Owing to this design it is possible, while providing for simultaneous locking engagement of the pin's eccentric locking member with the wall of the hole in the other furniture part, that the pin draws together the two furniture parts owing to its screwing function and holds same together with a clamping action. In this respect the screw thread serving to screw in the pin only has a helix angle which is sufficiently large to provide for the required self-braking action.

The housing may be provided with a peg-like tail extending past the first furniture part and having a diameter the same as the diameter of the hole in the second furniture part, the pin being held in a hole in such tail. The pre-assembly work undertaken on the connection fitting is performed in such a manner that firstly the peg-like tail of the pot-like housing, secured in the recess in the first furniture part, is inserted into the hole in the other furniture part. After such pre-assembly the lever is turned round for locking and clamping the two furniture parts.

The housing may be provided in its middle portion with an outwardly opening recess widening out the hole, in which the radial lever is arranged. The width of such recess will determine the angle, through which the lever may be pivoted between its assembly position and its locking position. The recess is preferably arranged in the middle of the housing with the result that it interrupts the holes located in the opposite housing walls delimiting same. Preferably both hole sections are provided with screw threads for receiving screw threads on the pin.

The pin can consist of two shank parts of different diameter and have its shank part of lesser diameter, which bears the locking member, extending through front wall of the housing or, respectively, through the tail thereof.

Owing to normal manufacturing tolerances it is not always possible to ensure that the pivot lever may be so moved into its turned over position that in such position locking of the two furniture parts is ensured. In order to as far as possible to always have a satisfactory connection together of the two furniture parts, the screw threads are so designed that the clamping locking action is achieved at the latest on complete turning round of the locking lever and mostly on pivoting through a smaller angle of pivot. In order however to ensure that in its locked setting the lever will always lie flat against the housing or is even fitted into it, in accordance with a preferred embodiment of the invention there is a provision such that the actuating lever is connected with the pin by a friction coupling. This coupling is preferably so designed that after abutment and clamping together of the two furniture parts to be joined, the coupling slips at a predetermined torque. Such a coupling set to a predetermined torque may comprise a ring which is connected with the actuating lever and bears by means of a belleville washer loading the same on an annular collar on the pin. It is in this manner that the actuating lever may be rested on the pin with a given fracture moment.

The coupling may be designed as well in a simple manner by providing the pin adjacent to the recess in the housing with teeth, while the actuating lever is provided a ring surrounding the pin and having corresponding internal teeth with the result that on axial sliding of the actuating lever in the recess same may be brought into and out of engagement with the teeth on the pin. In the case of this embodiment of the invention for the purpose of assembly the actuating lever is moved into engagement with the teeth on the pin so that same may be turned by the actuating lever for the purpose of being locked. If the actuating lever at the end of the locking and turning movement is not in its setting resting against the housing, it can be slid so far by axial sliding on the pin in the recess in the housing that it comes clear of the teeth on the pin and may be pivoted into its setting engaged with the housing so that it no longer sticks out and creates an unpleasing effect. The toothed portion of the pin is preferably located on its section with the larger diameter.

Preferably the hole in the rear wall of the housing is in the form of a blind hole, whose depth is so selected that the pin will bear against the floor of such blind hole, when its locking setting is reached. Owing to this design it is possible to ensure that in the course of the locking by turning the pin, the eccentric locking member can not rip up and damage the wall section of the hole in the other furniture part.

It is convenient if the housing comprises two housing halves, whose plane of junction extends through the axis of the hole. The housing halves may be provided with complementary pegs and holes at their junction planes, with the result that they may be mounting in place by simple plugging together to constitute the housing. This design of the housing renders possible a simple way of holding and mounting the pin in a rotary manner by insertion into the housing halves prior to assembly. The housing or, respectively, the housing halves will preferably be in the form of plastic injection moldings.

The actuating lever can be provided with a projection designed to fit, in the locking setting of the lever, in a corresponding recess in the housing for arresting the lever.

An other advantageous feature of the invention is such that the pin possesses an eccentric shank part extending beyond the housing, on which a disk is secured having a cutting rib or edge. The disk is preferably provided with at least one cutting or self-tapping screw thread with the result that as the screw thread bites into the wall of the hole of the other furniture part the pin is drawn into the same.

In keeping with a particularly preferred form of the invention the pin is held in an eccentric hole in the housing wall or, respectively, of the peg-like tail. Prior to assembly of the connection fitting the pin will be in a position, in which the two eccentric parts of the hole and of the eccentric shank part are so aligned in relation to one another that the disk or the clamping part does not, as seen in axial plan view, extend past the peg-like tail with the result that the peg-like tail may be inserted into the hole, having the same diameter, inside the other furniture part without hinderance. By turning the pin by means of the actuating lever then, owing to the two eccentric parts, the disk will be moved out of the cylindrical enveloping outline of the tail in a radial direction so that it will engage the wall of the hole in the other furniture part in a frictional or positive and interlocking fashion to anchor the pin.

BRIEF DESCRIPTION OF THE DRAWINGS

Working embodiments of the invention will now be described with reference to the accompanying drawing in more detail.

DETAILED DESCRIPTION OF THE PREFERRED EMBODIMENTS

Figure 6:
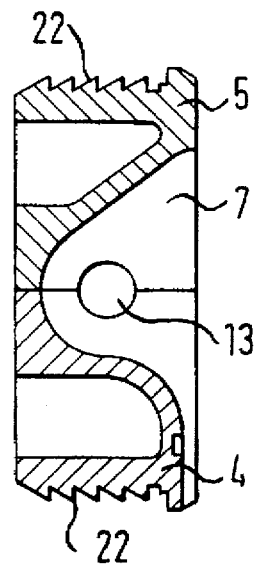
FIG. 6 shows a section taken on the line VI—VI in figure through the housing.
Figure 7:
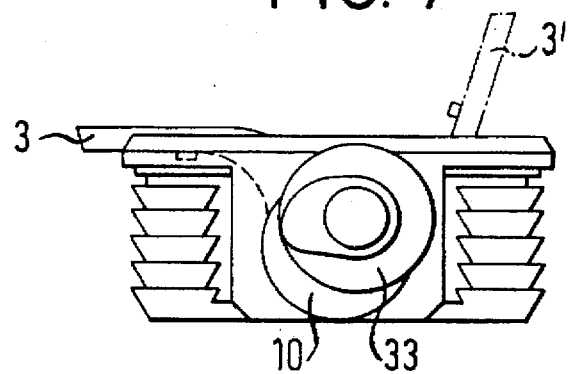
FIG. 7 is a front end view of the connection fitting.
Figure 8:
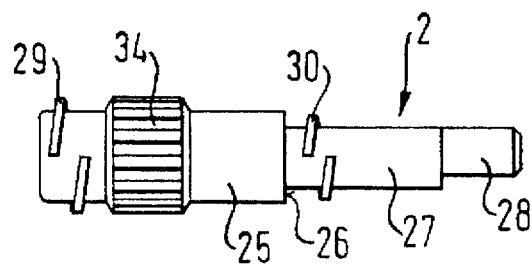
FIG. 8 is a lateral elevation of the first embodiment of the pin.
Figure 9:
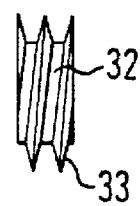
FIG. 9 is a lateral elevation of the disk with self-tapping screw threads.
Figure 11:
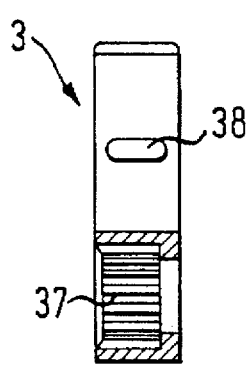
FIG. 11 is a section taken along the line XI—XI of the actuating lever of FIG. 10.
Figure 10:
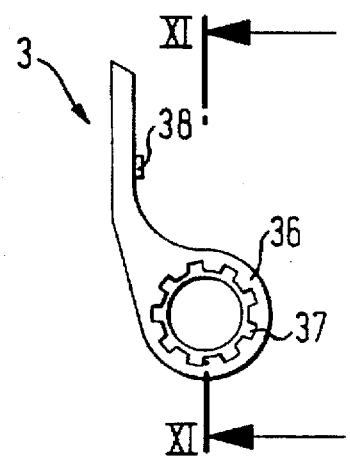
FIG. 10 is a lateral elevation of the actuating lever for the pin in accordance with FIG. 8.

The connection fitting comprises a housing, to be best seen in FIGS. 4 through 7, and a pin 2, which is rotatably mounted therein and is able to be turned through a limited pivot angle by means of a lever 3, such pin being most clearly illustrated in FIGS. 8 through 10.

Figure 5:
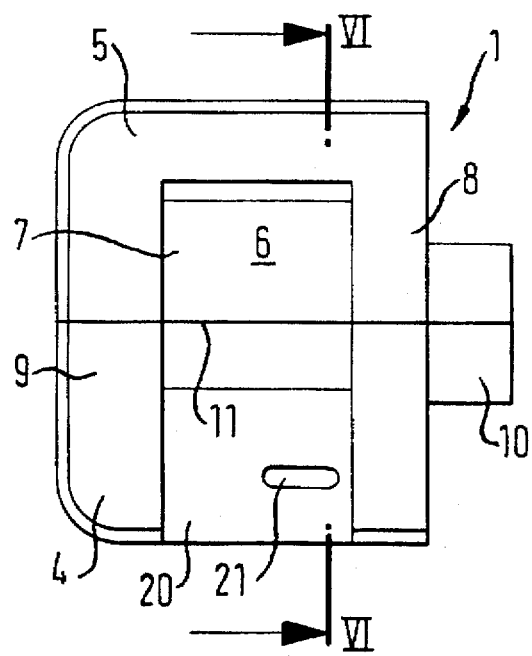
FIG. 5 is a plan view of the pot-like housing in the assembled state of its parts.

The housing 1 is composed of two housing halves 4 and 5 and possesses an essentially pot-like configuration. The housing has a central, essentially rectangular recess which is open in an upward direction and a downward direction, has a floor 6 and which is formed between a front wall 8 and a rear wall 9. In a middle part thereof the front wall 8 possesses a peg-like tail 10. The housing is provided in its central plane 11 with a hole, that is to say a blind hole 12 in the rear wall part, which is aligned with a through hole 13 of lesser diameter in the front wall 8 and with the peg-like tail 10 connected integrally with it. In the holes 12 and 13 two screw threads 15 and 16 are respectively machined in the fashion indicated in FIG. 4. At the junction planes corresponding to the central plane 11 the housing 1 possesses pegs 17 and corresponding complementary holes 18 with the result that the housing halves depicted in FIG. 4 can be simply joined together to give the housing as indicated in FIGS. 5 and 6.

The recess 7 in the housing 1 is delimited by lateral walls. The lower wall indicated in FIGS. 5 and 6 is provided with a recess 20 and with a slot 21, which serve to receive the actuating lever 3 in its neutral position.

In the illustrated working embodiment of the invention the housing 1 possesses a generally rectangular configuration and at its outer walls is provided with toothed ribs 22 serving for holding it in place.

Figure 1:
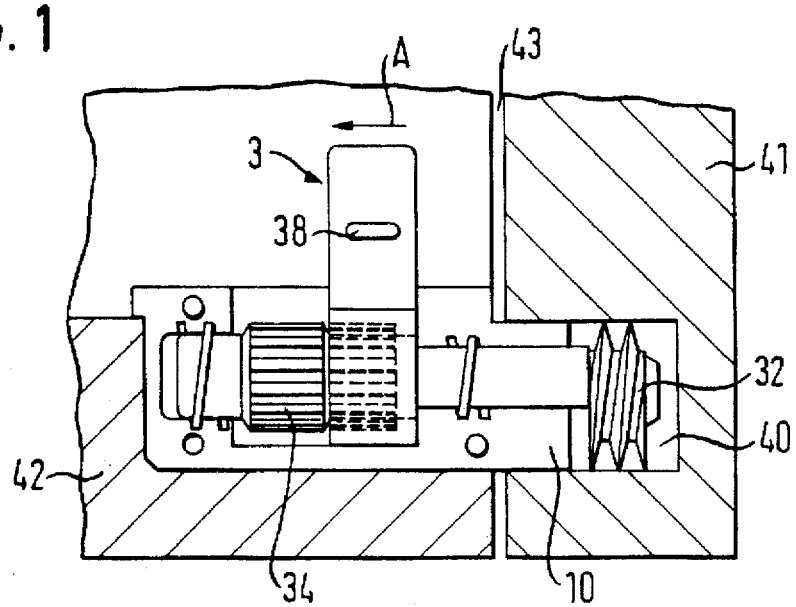
FIG. 1 shows a longitudinal section taken through a first embodiment of the connection fitting in its assembly position on the two furniture parts to be joined together.
Figure 2:
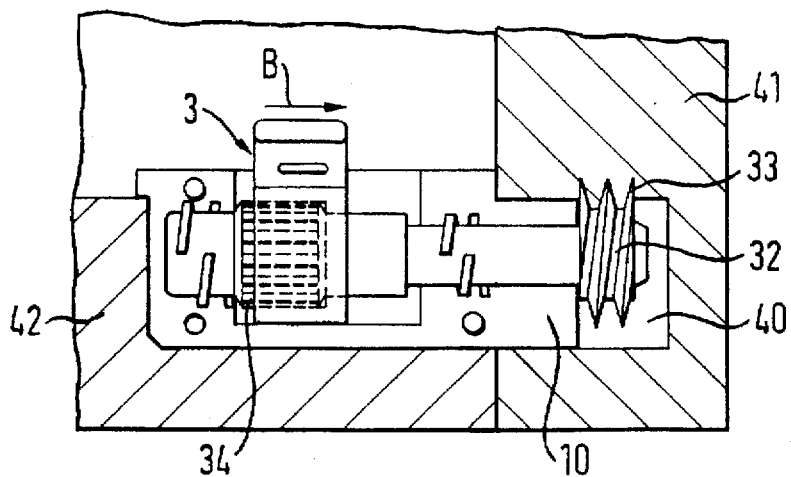
FIG. 2 is a showing corresponding to FIG. 1 of the connection fitting in its position locking together the two furniture parts.
Figure 3:
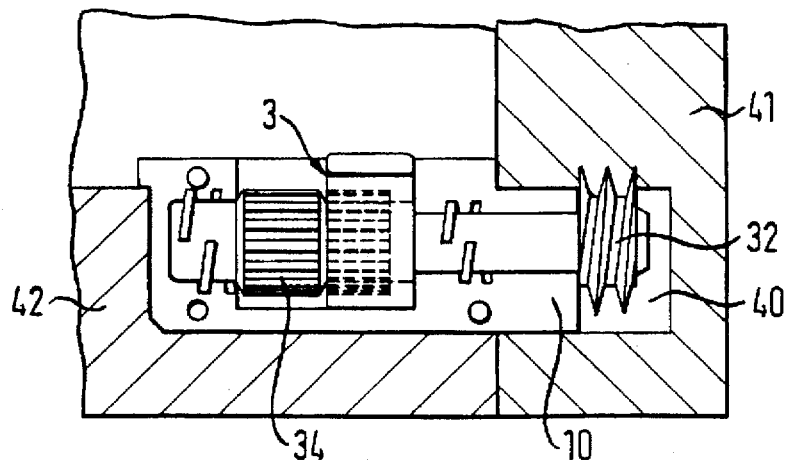
FIG. 3 is a elevation corresponding to FIG. 2 of the connection fitting wherein the actuating lever is moved clear of the pin after locking and is pivoted into its neutral setting.
Figure 4:
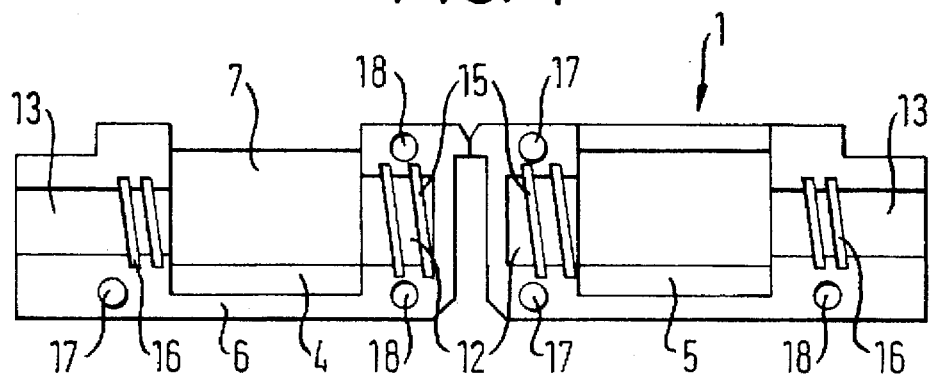
FIG. 4 shows a view looking toward the junction planes of the two housing parts constituting a pot-like housing.

In the housing 1 the pin 2 is rotatably mounted in the fashion indicated FIGS. 1 through 3. The pin 2 consists of a first shank part 25, a shank part 27 of smaller diameter connected with same along an annular step 26 and a terminal eccentric shank part 28 connected with same. The shank parts 25 and 27 are provided in their terminal or end parts, as shown in FIG. 8, with a screw thread 29 and 30. On the eccentric shank part 28 the disk 32 is held, which is provided with a corresponding through hole and two self-tapping screw threads 33. The disk 32 may be secured on the eccentric shank part 28, by producing a rivet head on this end of the shank part as shown in FIGS. 1 through 3.

The shank part 25 is integrally provided with a toothed section 34. The annular part 36 part of the actuating lever 3 is slipped over onto the shank part 25, such annular part being provided with internal teeth 37 corresponding to the toothed section 34. For assembly prior to attachment of the disk 32 on the shank part 25, the annular part 36 of the actuating lever 3 is put on. The pin prepared in this manner is then so inserted into the housing halves 5 and 6 that the toothed section 34 and the annular part 36 of the actuating lever 3 are located in the recess 7. Then the housing halves are put together around the pin 2 so that the screw threads 29 and 30 fit in between the screw threads 15 and 16 in the walls of the holes 13 and 14.

The width in the actuating lever 3 is the same as the width of the recess 20. On its lower side the actuating lever 3 possesses a knob 38 with which the actuating lever may be arrested in its neutral position in the slot 21 of the recess 20.

The hole 13 in the peg-like tail 10 is eccentrically arranged with the result that the pin 2 may be turned into the position indicated in FIG. 1, in which the envelope surface of the screw threads on the disk 32 is aligned with the pin 10. In this setting, in the fashion indicated in FIG. 1, the pin 10 is inserted into the hole 40 in the other furniture part 41, whose diameter is the same as the diameter of the peg-like tail 10. In this pre-assembly position as indicated in FIG. 1 then the annular part 36 provided with the internal teeth 37 is brought into engagement with the toothed section 34 of the pin by axial movement in the direction of the arrow A in FIG. 1 with the actuating lever 3 pivoted outward. By pivoting of the actuating lever 3 into the position indicated in FIG. 2 on the one hand the self-tapping screw threads 33 on the disk 32 emerge from the cylindrical envelope surface of the peg-like projection 10 in the manner indicated FIG. 2 so that they make cutting engagement with the internal wall surface of the pre-drilled hole 40, while simultaneously owing to the rotary movement the pin 2 is moved to the left, because the screw threads 29 and 30 perform a screwing motion in between the screw threads in the hole. Owing to such screwing movement the furniture part 41 is drawn toward the furniture part 42 with the result that the gap 43 between the two furniture parts is closed up in the manner indicated in FIG. 2. Once the parts have been so arrested, the actuating lever 3 is moved axially in the direction of the arrow B in FIG. 2 into a setting, in which it is alongside the toothed section 34 in the slot 7 in the housing 1. In this setting it is possible for the actuating lever to be pivoted right into its neutral position indicated in FIG. 3, in which it is in the recess 20 and has its knob 38 fitting in the slot 21 to lock it. This assembled state of the connection fitting is indicated in FIG. 3.

The connection fitting may be released in a simple manner by moving the lever out of its neutral position and bringing its annular part into engagement with the toothed section 34 of the pin 2 with the result that the latter may be turned into its released position.

In FIG. 7 the position corresponding to FIG. 1 of the lever 3' is represented in chained lines. Starting in this position the locking turning of the pin is performed by pivoting the lever toward the neutral position 3.

Figure 12:
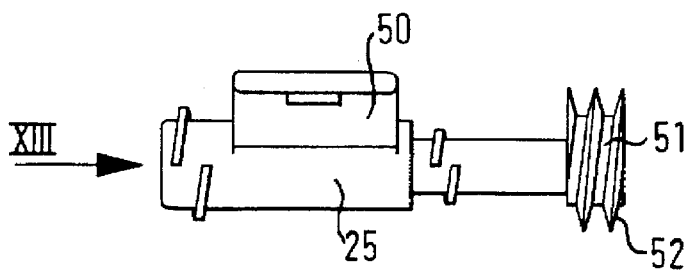
FIG. 12 is a lateral view of a second embodiment of the pin with an actuating lever connected integrally with same.
Figure 13:
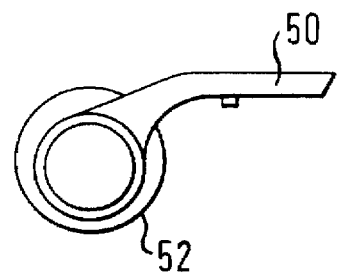
FIG. 13 is a view of the pin looking in the direction of the arrow XIII in FIG. 12.

FIGS. 12 and 13 indicate a second embodiment of the connection fitting, which merely differs from the connection fitting of FIGS. 1 through 10 because the actuating lever 50 is integrally connected with the shank part 25. The actuating lever 50, which is integral with the pin, may for instance be manufactured of ZAMAK die casting zinc alloy. Furthermore the disk 51 with the self-tapping screw thread 52 may be manufactured integrally with the pin and like same consist of ZAMAK die casting zinc.

We claim:

1. A connection fitting for providing a releasable engagement between two furniture parts, said connection fitting comprising
   a pot-like housing for insertion in a recess in a first furniture part, said housing including two spaced holes, said housing also including a peg-like tail for projecting past the first furniture part, said peg-like tail having a diameter dimensioned to be the same as a diameter of a hole in a second furniture part,
   a pin rotatably mounted in the holes of said housing, a front end of said pin extending fully out of said housing and including an eccentric locking member, said eccentric locking member being adapted to be inserted into the hole in the second furniture part, said pin including a radially extending actuating lever for rotating said pin and thereby rotating said eccentric locking member to be fixed in the hole of the second furniture part.

2. The connection fitting as claimed in claim 1, wherein said holes in said housing are provided along at least a part of their length with a screw thread.

3. The connection fitting as claimed in claim 1, wherein said housing is provided in a central portion thereof with a recess, said radially extending lever extends from said recess.

4. The connection fitting as claimed in claim 3, wherein said recess is located between said two holes.

5. The connection fitting as claimed in claim 4, wherein said two holes are provided with screw threads for receiving projecting screw thread parts of said pin.

6. The connection fitting as claimed in claim 1, wherein said pin includes two shank parts of different diameter, one shank part of lesser diameter, which bears said locking member, extending through a front wall of said housing.

7. The connection fitting as claimed in claim 6, wherein said pin is provided with a toothed portion on one of said shank parts and said actuating lever is provided with a ring encircling the pin and having internal teeth corresponding to said toothed portion so that said ring may be brought into and out of engagement with said toothed portion of said pin upon axial shifting of said actuating lever.

8. The connection fitting as claimed in claim 7, wherein said toothed portion is located on the other shank part of said pin.

9. The connection fitting as claimed in claim 1, wherein said actuating lever is connected with said pin by a friction coupling.

10. The connection fitting as claimed in claim 9, wherein said friction coupling will release upon application of a predetermined amount of torque to said actuating lever.

11. The connection fitting as claimed in claim 1, wherein one hole of said two holes is located in a rear wall of said housing and is a blind hole.

12. The connection fitting as claimed in claim 1, wherein said housing comprises two housing halves having a junction plane extending through an axis of said pin.

13. The connection fitting as claimed in claim 12, wherein said housing halves include complementary pegs and holes.

14. The connection fitting as claimed in claim 1, wherein said actuating lever is provided with a knob for fitting into a corresponding slot in said housing in one of a locking and neutral position of said actuating lever for preventing movement of said actuating lever.

15. The connection fitting as claimed in claim 1, wherein said eccentric locking member includes an eccentric shank part of said pin and a disk having a cutting rib.

16. The connection fitting as claimed in claim 15, wherein said cutting rib is a screw thread having at least one self-tapping turn.

* * * * *